Oct. 21, 1952     W. H. ANDERSON     2,614,733
HOPPER DOOR UNIT AND MATERIAL SPREADER ASSEMBLY FOR AIRPLANES
Filed May 5, 1947     3 Sheets-Sheet 1
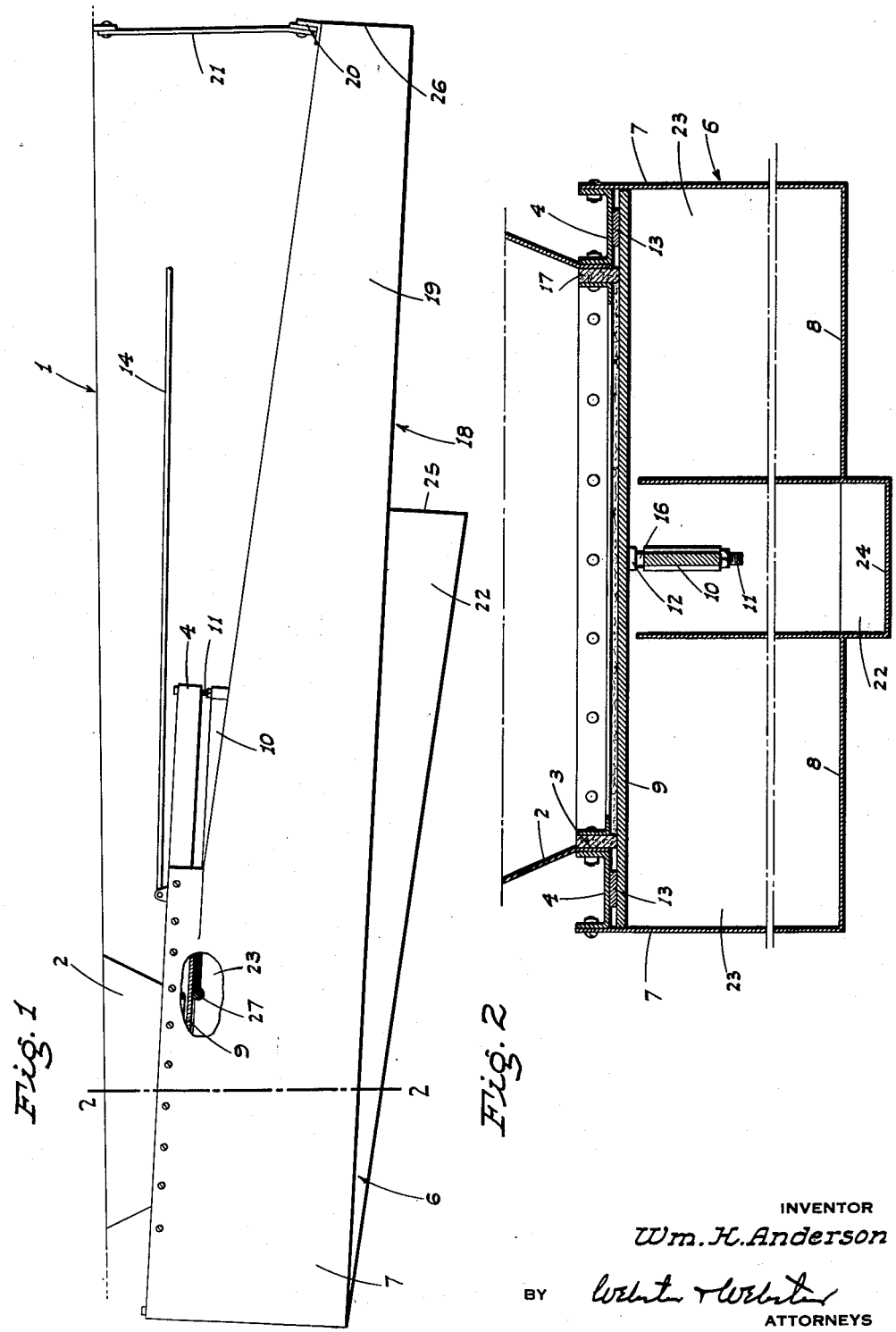
INVENTOR
Wm. H. Anderson
BY Webster & Webster
ATTORNEYS

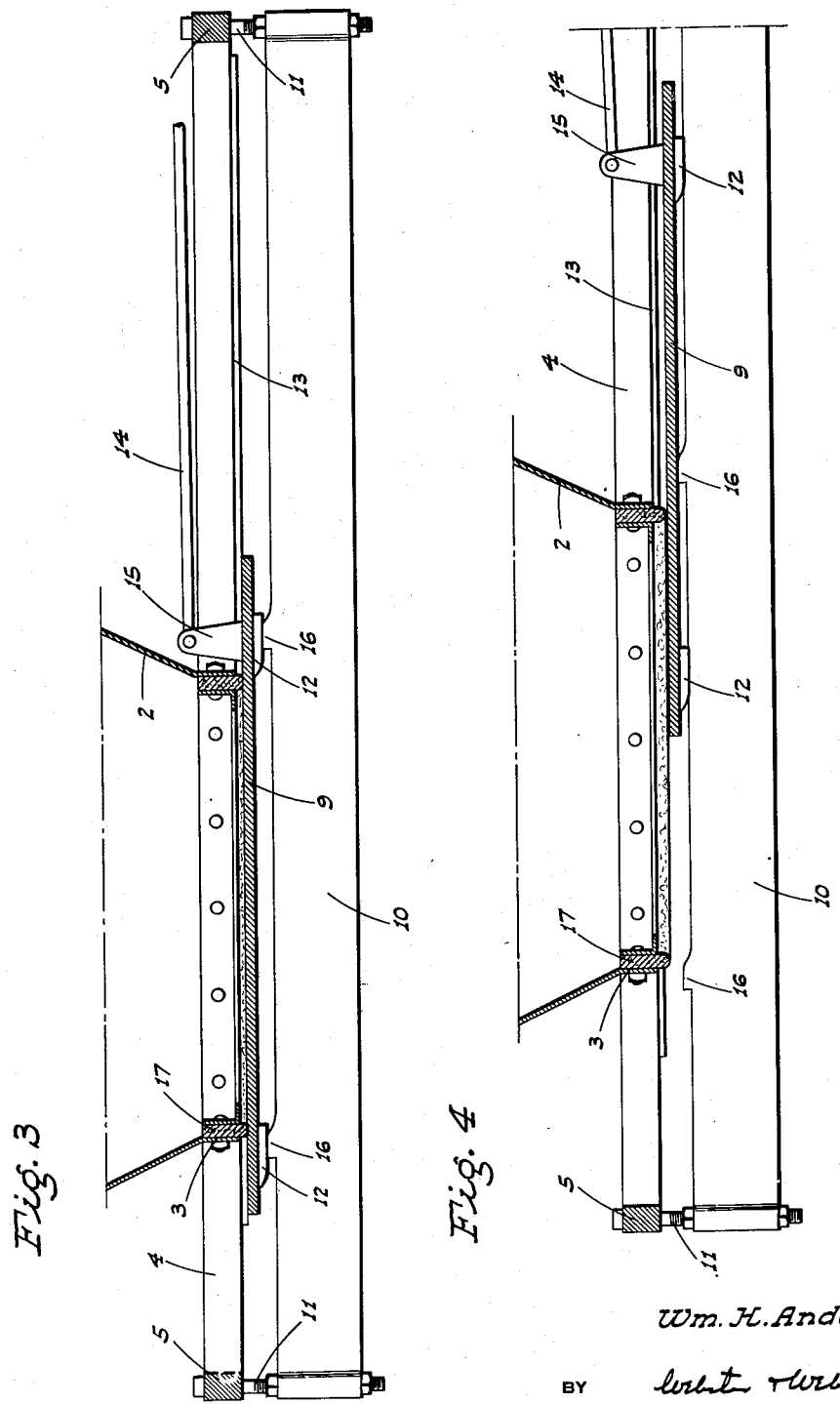

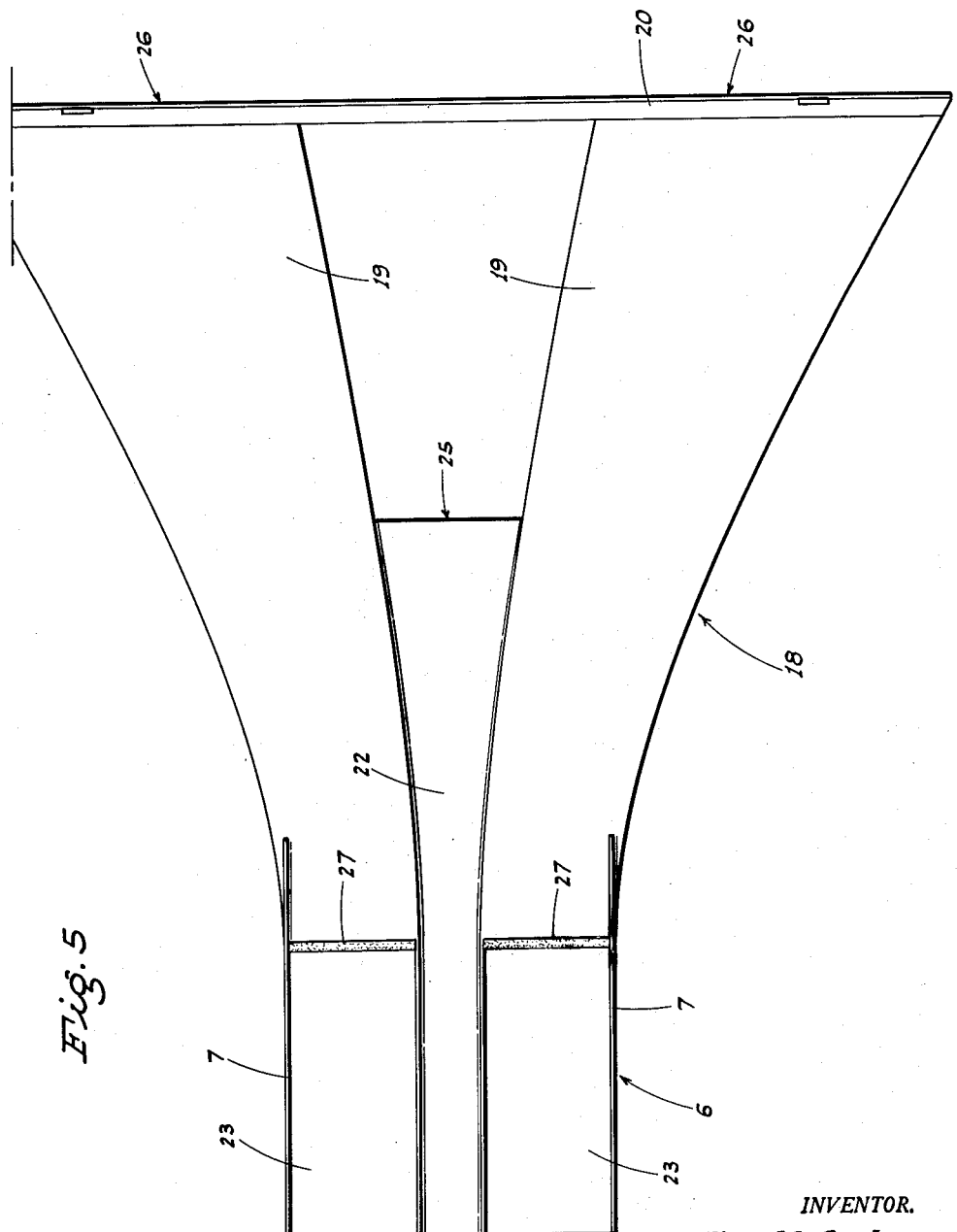

Patented Oct. 21, 1952

2,614,733

UNITED STATES PATENT OFFICE 2,614,733

HOPPER DOOR UNIT AND MATERIAL SPREADER ASSEMBLY FOR AIRPLANES

William H. Anderson, Stockton, Calif.

Application May 5, 1947, Serial No. 745,922

3 Claims. (Cl. 222—512)

This invention is directed to, and it is an object to provide, improvements in the material discharge mechanism on airplanes for use for crop seeding, dusting, etc.

Another object of the invention is to provide a material discharge mechanism, for the purpose described, which includes a novel hopper door unit; the latter being designed for easy, non-jamming operation, positively shutting the hopper against leakage when closed and permitting of unobstructed flow of the material out of the hopper when said door unit is open.

A further object of the invention is to provide a hopper door unit, as in the preceding paragraph, which includes a novel supporting rail and cam arrangement operative to permit of free motion of the door between open and closed positions, but operative—as the door reaches closed position—to raise said door in frictional, sealing relation with a depending, peripheral gasket at the bottom of the hopper.

An additional object is to provide a novel material spreader arranged with the door unit in a manner to accomplish an effective and even distribution of the material as fed from the hopper through the door unit when the latter is open.

A further object of the invention is to provide a simple and practical hopper door unit and material spreader assembly for airplanes which will be exceedingly effective for the purpose for which it is designed.

These objects are accomplished by means of such structure and relative arrangement of parts as will fully appear by a perusal of the following specification and claims.

In the drawings:

Fig. 1 is a side elevation of the hopper door unit and material spreader assembly as mounted in connection with the bottom of an airplane fuselage.

Fig. 2 is a cross section on line 2—2 of Fig. 1.

Fig. 3 is a longitudinal sectional elevation of the hopper door unit in closed position.

Fig. 4 is a similar view, but shows said unit partially open.

Fig. 5 is a plan view of the material spreader assembly.

Referring now more particularly to the characters of reference on the drawings, the numeral 1 indicates the bottom of the fuselage of an airplane of the type used for crop seeding, dusting, or the like, which airplane includes a hopper 2 projecting downwardly from the fuselage from a material reservoir (not shown) within said fuselage.

At its lower end the hopper 2 is formed with a rectangular frame 3, and on opposite sides said frame 3 is fixed in connection with longitudinal side beams 4 of upwardly opening channel configuration, which extend laterally outwardly in opposite directions from said frame. The side beams 4 are connected, at opposite ends, by rigid cross beams 5.

An air tunnel is indicated generally at 6, which air tunnel is open-ended and generally rectangular in cross section, though relatively shallow as compared to its width. Such air tunnel 6 includes side plates 7 and a bottom plate 8; the side plates 7 being secured at their upper ends to the outer flanges of the longitudinal side beams 4. The air tunnel 6 is of a length, and is positioned, so that it extends from a point ahead of the hopper 2, to a point rearwardly thereof, so that the hopper discharges directly into said tunnel.

A flat rectangular door 9 is disposed for longitudinal sliding motion in the air tunnel 6 adjacent the top of the latter, and in cooperative relation to the hopper 2; such door being supported for sliding movement by a central longitudinal supporting rail 10 secured at its opposite ends to the cross beams 5 by adjustable suspension bolts 11. At the bottom, and at longitudinally spaced points, the door 9 is fitted with guide shoes 12 which run on the upper edge of the rail 10; there being longitudinal wear strips 13, on the bottom beams 4, and against which wear strips portions of the door 9 adjacent its side edges are adapted to run.

The door is actuated, between open and closed positions relative to the hopper 2, by means of a longitudinal control rod 14 secured to said door outside the hopper by means of an ear 15; such control rod being operative from within the pilot's compartment of the airplane by means of mechanism not here shown.

When the door 9 is moving between open and closed positions, the guide shoes 12 engage and slide along the upper edge of the rail 10, and at this time the door is quite free of the hopper and slides easily.

As the door 9 reaches a closed position relative to the hopper 2, the guide shoes 12 engage and ride up onto upstanding cams 16 formed in spaced relation on the upper edge of the rail 10 corresponding to the spacing of such shoes. When this occurs, a vertical or raising motion is imparted to the door 9, causing the upper surface of the latter to engage in frictional or compressing relation with a rectangular felt gasket 17 fixed in connection with the bottom frame 3 of the hopper and depending somewhat therebelow. Thus, as the door 9 comes to closed position, and with slightly further longitudinal motion, such door is raised into positive sealing engagement with the gasket 17, thus preventing any accidental leakage of material from the hopper 2. It should be particularly noted that the shoes 12 and cams 16 are positioned so that they engage and function only after the door 9 is in a closed position relative to the hopper 2, which means that there can be no appreciable drag, lengthwise, on the felt gasket 17 by said door.

The bottom opening of the hopper 2, and the corresponding effective portion of the door 9, are relatively small in plan, so that when said door is substantially fully open only a reasonable amount of material may flow from the hopper for distribution; yet clogging is prevented for the reason that the door is out of the way of the flow.

When the door 9 is open, material flows from the hopper 2 into the air tunnel 6; the air blast passing rearwardly in said tunnel, forcefully discharging such material from said tunnel through a material spreader assembly, indicated generally at 18, which comprises the following structural arrangement:

A pair of rearwardly and laterally outwardly flaring discharge chutes 19 are in communication at their forward ends with the rear of the air tunnel 6 in transversely spaced relation; said discharge chutes decreasing in height and increasing in width toward their rear ends. Also, such chutes are dimensioned so that their cross sectional area increases from front to rear ends thereof. At their rear ends said chutes are connected by a cross bar 20 suspended from the fuselage by means of transversely spaced suspension links 21.

The material spreader assembly also includes a narrow central longitudinal trough 22, open on top, extending from the front end of the air tunnel 6 rearwardly through the same and thence projecting between the discharge chute 19, but terminating short of the rear ends of the latter. At its upper edges the trough 22 is disposed in closely adjacent and in clearance relation to the bottom of the door 9; the rail 10 being disposed within said trough.

As the sides of the trough 22 within the tunnel 6 are actually continuations of corresponding sides of the chutes 19, said trough defines, on opposite sides thereof, air passages 23 in the tunnel 6 in direct and corresponding communication with said chutes 19. The air tunnel 6, and the chutes 19 have a slight downward and rearward inclination imparted thereby by the mounting. The bottom end 24 of the trough 22 extends at a rearward and downward incline somewhat greater than the incline of the tunnel 6 and chutes 19, whereby said trough 22 discharges at its rear end 25 at a slightly lower point than the rear ends 26 of the chutes 19, but ahead of the latter.

When the door 9 is open, material from the hopper 2 falls through the bottom of the latter into the air tunnel 6, a portion of said material dropping into the trough 22, while other portions fall into the air passages 23 and deliver to the chutes 19 by reason of the air blast.

From the rear ends 25 and 26 of the trough 22 and chutes 19, respectively, material, such as crop seed, is discharged by the air blast from the airplane.

As the three points of discharge are in different paths transversely of the direction of travel, an effective spreading or distribution is accomplished.

A pair of transverse sealing strips 27, of felt or the like, are applied to the top, forward edges of the chutes 19, whereby when the door is in an open position such strips seal with the door and prevent any material escape rearwardly between the bottom of the same and said edges.

From the foregoing description it will be readily seen that there has been produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful and upon which Letters Patent are desired:

1. A hopper door unit for a material distributing airplane which includes a material hopper, said unit comprising longitudinal side beams secured to opposite sides of the hopper adjacent the bottom thereof, cross beams connecting opposite ends of the side beams, a central longitudinal rail connected between the cross beams and extending in clearance relation under said hopper, a door disposed between the bottom of the hopper and said rail adapted to slide lengthwise of the latter between open and closed positions, the side beams overhanging and being close to the gate, side elements depending from the side beams to guide the door, means supporting the door on the rail for such sliding motion, means connected to the door to slide the same, a gasket on the bottom of the hopper, the door being relatively free of the gasket during the major part of its travel, and cam means between the rail and door operative to elevate the door into frictional contact with the gasket when the door is closed.

2. A hopper door unit which includes in combination with a hopper having a discharge opening in its lower end, a longitudinally disposed beam on each side of the hopper, a wear strip on the under side of each beam, the bottom surfaces of said wear strips lying in a horizontal plane below that of the lower end of the hopper, a compressible gasket disposed around the lower periphery of the hopper opening and projecting to a point below the latter; the lower edge of the gasket lying in a horizontal plane below that of the wear strips, a longitudinal rail disposed below the hopper opening and lying in a vertical plane substantially midway between the wear strips and in substantial parallelism with the latter, a rectangular door of a size to close the hopper opening, longitudinally spaced shoes on the under side of the door and supporting the door on the rail for sliding movement along the rail, means to slide the door, the upper surface of the door normally lying in a horizontal plane below that of the lower edge of the gasket and wear strips for the major portion of its travel along said rail, and a pair of longitudinally spaced vertical cams on the rail, the cams lying in vertical planes closely adjacent those of opposite sides of the gasket, the shoes on the door being so spaced as to ride up onto the cams after the door has moved to a position under the hopper opening, such latter action being effective to lift the door vertically into frictional engagement with the wear strips and compressive engagement with the gasket.

3. A hopper door unit for a material distributing airplane which includes a material hopper, said unit comprising a central longitudinal rail fixed with and extending in clearance relation under the hopper, a door disposed between the bottom of the hopper and said rail adapted to slide lengthwise of the latter between open and closed positions, shoes on the door riding the rail, means connected to the door to slide the same, a compressible gasket on the bottom of the hopper, cams on the rail to engage the shoes and elevate the door into frictional contact with the gasket, and side members fixed with the rail and hopper, and overhanging the door adjacent the sides to normally allow of limited vertical and lateral tilting movement of the door.

WILLIAM H. ANDERSON.

REFERENCES CITED

The following references are of record in the file of this patent:

UNITED STATES PATENTS

| Number | Name | Date |
| --- | --- | --- |
| 177,211 | Curran | May 9, 1876 |
| 339,454 | McWhorter | Apr. 6, 1886 |
| 352,158 | Snyder | Nov. 9, 1886 |
| 441,810 | Strawson | Dec. 2, 1890 |
| 568,776 | Leggett | Oct. 6, 1896 |
| 657,957 | Pyle | Sept. 18, 1900 |
| 941,442 | Dornfeld | Nov. 30, 1909 |
| 1,384,175 | Allen et al. | July 12, 1921 |
| 1,618,443 | Knight | Feb. 22, 1927 |
| 1,691,205 | Morse | Nov. 13, 1928 |
| 1,921,062 | Adams | Aug. 8, 1933 |
| 2,069,350 | Blue | Feb. 2, 1937 |
| 2,177,313 | Beauchamp | Oct. 24, 1939 |
| 2,334,376 | Bauer | Nov. 16, 1943 |
| 2,337,817 | Hertrich | Dec. 28, 1943 |

FOREIGN PATENTS

| Number | Country | Date |
| --- | --- | --- |
| 817,473 | France | May 24, 1937 |